United States Patent
Fukushima

(10) Patent No.: US 7,943,055 B2
(45) Date of Patent: May 17, 2011

(54) SECONDARY CIRCULATION COOLING SYSTEM

(75) Inventor: Masato Fukushima, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/751,099

(22) Filed: May 21, 2007

(65) Prior Publication Data

US 2007/0235681 A1  Oct. 11, 2007

Related U.S. Application Data

(63) Continuation of application No. PCT/JP2005/021479, filed on Nov. 22, 2005.

(30) Foreign Application Priority Data

Nov. 22, 2004  (JP) ................................. 2004-337577

(51) Int. Cl.
  *C09K 5/04* (2006.01)
(52) U.S. Cl. ......................................................... 252/67
(58) Field of Classification Search .................... 252/67, 252/68
  See application file for complete search history.

(56) References Cited

U.S. PATENT DOCUMENTS 6,148,634 A  11/2000  Sherwood
7,220,363 B2 *  5/2007  Minor et al. .................... 252/68

FOREIGN PATENT DOCUMENTS

| JP | 2881195 | 2/1999 |
|----|---------|--------|
| JP | 2000-7603 | 1/2000 |
| JP | 2002-543363 | 12/2002 |

OTHER PUBLICATIONS

European Search Report issued Oct. 15, 2010 in PCT/JP05/21479 filed Nov. 22, 2005.
Sekiya et al., "The Potential of Hydrofluoroethers to Replace CFCs, HCFCs and PFCs," Journal of Fluorine Chemistry, Feb. 1, 2000, pp. 215-221.
Ogawa et al., Excess Molar Enthalpies and Volumes of Binary Mixtures of Two Hydrofluoroethers with Hexane, or Benzene, or Ethanol, or 1-Propanol, or 2-Butanone at $T= 298.15K$, Journal of Chemical Thermodynamics, May 2003, pp. 763-774.

* cited by examiner

*Primary Examiner* — John R Hardee
(74) *Attorney, Agent, or Firm* — Oblon, Spivak, McClelland, Maier & Neustadt, L.L.P.

(57) ABSTRACT

To provide a secondary circulation cooling system using a composition which is less influential over the environment as a secondary coolant, is non-inflammable, has a small pressure drop particularly at a low temperature and has a large heat transfer coefficient.
A secondary circulation cooling system comprising a primary cooling means 1 using a primary coolant, a secondary circulation cooling means 13 using a secondary coolant and a heat exchange means 6 to carry out heat exchange between the primary coolant and the secondary coolant, characterized in that a composition comprising a fluorinated ether such as $CF_2HCF_2OCH_2CF_3$, and an alcohol such as ethanol, is used as the secondary coolant.

3 Claims, 3 Drawing Sheets

SECONDARY CIRCULATION COOLING SYSTEM

TECHNICAL FIELD

The present invention relates to a secondary circulation cooling system.

BACKGROUND ART

A usual cooling device is constructed to have a system for cooling an object indirectly by a coolant which is circulated in a refrigeration cycle. Heretofore, as such a coolant, halogen derivatives such as chlorodifluoromethane have been commonly used. However, many of them are compounds having chlorine atoms in their structures and are considered to be related to ozone depletion, and they are gradually banned. Further, as halogen derivatives containing no chlorine, perfluorocarbons (PFC) or hydrofluorocarbons (HFC) are known. These halogen derivatives are in many cases related to global warming, and their discharge is required to be controlled.

Further, it has been studied to use ammonia, hydrocarbons, carbon dioxide, etc., as the above coolant, but their commercial use has been difficult because of safety problems such as their toxicity, flammability, corrosive, etc. or for reasons such that the operation pressure tends to be high, or the energy efficiency is poor.

For the purpose of overcoming such problems, a secondary circulation cooling system is used which comprises a primary cooling means and a secondary circulation cooling means. This is a system wherein in the first cooling means, ammonia or a hydrocarbon is used as a heat transfer medium (primary coolant), and in the secondary circulation cooling means, a heat transfer medium (secondary coolant) which is less influential over the environment and has a higher level of safety, is used, and the heat energy is exchanged in a non-contact manner between the primary coolant and the secondary coolant by a heat exchanger.

The secondary coolant is required to be excellent in the heat transfer property, flowability, anticorrosion property, stability and safety. As a conventional secondary coolant, an aqueous solution of calcium chloride, sodium chloride or the like, a glycol such as ethylene glycol or propylene glycol, an alcohol, polydimethylsiloxane, a hydrocarbon, a chlorofluorocarbon (CFC), a hydrochlorofluorocarbon (HCFC), or a PFC, may, for example, be mentioned.

However, CFCs or HCFCs are considered to remain in the environment or to be related to ozone depletion, and they are gradually banned. PFCs have a high global warming coefficient, and their discharge is required to be controlled. On the other hand, an aqueous solution of calcium chloride or sodium chloride, a glycol or an alcohol has several problems such that it is corrosive, is not sufficiently safe or requires a large power for transportation.

As a method to solve such problems, a method of using a fluorinated ether such as $C_3F_7OCH_3$ as a secondary coolant, has been proposed (Patent Document 1). Although this method is less influential over the environment, with respect to the properties as a secondary coolant, such as the pressure drop and heat transfer, it is not necessarily adequate.

Patent Document 1: JP-A-11-513738 (Claims)

DISCLOSURE OF THE INVENTION

Object to be Accomplished by the Invention

It is an object of the present invention to provide a secondary circulation cooling system using as a secondary coolant a medium which is a heat transfer medium which is non-flammable, is less influential over the environment and is suitable particularly for a low temperature application and which has a small pressure drop and a large heat transfer coefficient.

Means to Accomplish the Object

The present invention provides a secondary circulation cooling system comprising a primary cooling means using a primary coolant, a secondary circulation cooling means using a secondary coolant and a heat exchange means to carry out heat exchange between the primary coolant and the secondary coolant, characterized in that a composition comprising a fluorinated ether and an alcohol, is used as the secondary coolant.

EFFECTS OF THE INVENTION

In the present invention, the composition to be used as the secondary coolant has a small pressure drop at the time of being recycled, whereby it becomes possible to reduce the power required for the circulation pump when the secondary circulation cooling system is to be operated, and it is possible to reduce the power consumption and improve the efficiency. Further, in the present invention, the composition to be used as a secondary coolant has a large heat transfer coefficient, whereby it becomes possible to reduce the heat transfer area and to scale down the instruments.

MEANINGS OF SYMBOLS

Figure 1:
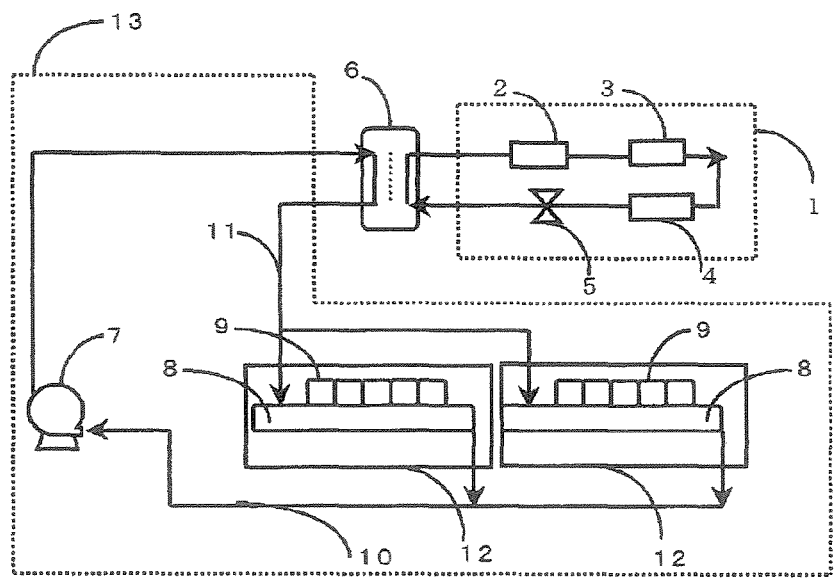
FIG. 1 shows an embodiment of the secondary circulation cooling system.

1: Primary cooling means
2: Evaporator
3: Compressor
4: Condenser
5: Expansion valve
6: Primary/secondary heat exchanger
7: Circulation pump for secondary circulation cooling 8: Cooling plate
9: Commercial product (object to be cooled)
10: Return line to secondary circulation cooling
11: Secondary coolant circulation line
12: Display case
13: Secondary circulation cooling means

BEST MODE FOR CARRYING OUT THE INVENTION

With the secondary circulation cooling system of the present invention, at the primary cooling means, the primary coolant to be used for cooling the secondary coolant, is cooled. Then, at the heat exchange means, heat exchange is carried out between the primary coolant and the secondary coolant, whereupon the cooled secondary coolant will be sent to the secondary circulation cooling means, and the primary coolant which has received a heat energy, will be returned to the primary cooling means. At the secondary circulation cooling means, the low temperature secondary coolant is forcibly circulated to a cooler by e.g. a pump, to indirectly cool an object to be cooled.

As the secondary coolant in the present invention, a composition comprising a fluorinated ether and an alcohol, is used. This composition is less influential over the environment, but has a high heat transfer coefficient with a small pressure drop at the time of being circulated, and thus, it is suitable as a heat transfer medium.

As the fluorinated ether, a hydrofluoroether is preferred. Particularly preferred is a compound represented by the formula $C_aF_bH_{2a+2-b}O_d$ (wherein a is an integer of from 3 to 6, b is an integer of from 1 to 14, and d is 1 or 2). Specifically, $CF_2HCF_2OCH_2CF_3$, $CF_3CHFCF_2OCH_2CF_3$, $CF_3CHFCF_2OCH_2CF_2CHF_2$, $C_3F_7OCH_3$, $C_4F_9OCH_3$ or $C_4F_9OC_2H_5$ is preferred, and $CF_2HCF_2OCH_2CF_3$ is particularly preferred. These compounds may be used alone or in combination as a mixture.

For the selection of the fluorinated ether, on the basis of the practical temperature range, installation design conditions, etc., a compound having proper physical properties such as freezing point, normal boiling point, critical temperature, density, specific heat, thermal conductivity and viscosity, is selected.

The content of the fluorinated ether in the above composition is not particularly limited. However, it is preferably at least 50 mass %, more preferably at least 70 mass %, further preferably at least 85 mass %, with a view to obtaining the effects of the present invention sufficiently.

As the alcohol, a $C_{1-4}$ alcohol is preferably used from the viewpoint of the normal boiling point, freezing point, flammability, availability, etc. Specifically, methanol, ethanol, 1-propanol, 2-propanol, 1-butanol or 2-butanol may, for example, be used. These alcohols may be used alone or in combination as a mixture.

The content of the alcohol in the above composition is not particularly limited However, it is preferably from 1 to 15 mass %, particularly preferably from 3 to 10 mass %. If the content of the alcohol exceeds 15 mass %, the composition is likely to show flammability, and there may be a case where the effect of coexistence of the fluorinated ether and the alcohol tends to be small.

Among such compositions, a composition comprising from 85 to 99 mass % of $CF_2HCF_2OCH_2CF_3$ and from 1 to 15 mass % of a $C_{1-4}$ alcohol is particularly preferred, since the effects of the present invention are particularly distinct such that the heat transfer coefficient is large, and the pressure drop is small at the time of being circulated.

The secondary coolant in the present invention may further contain at least one compound which is commonly used as a heat transfer medium. Such a heat transfer medium may, for example, be a chlorocarbon such as methylene chloride or trichloroethylene, or HCFC such as 1,1-dichloro-2,2,2-trifluoroethane, 1,1-dichloro-1-fluoroethane, 3,3-dichloro-1,1,1,2,2-pentafluoropropane or 3,3-dichloro-1,1,2,2,3-pentafluoropropane.

Further, the secondary coolant in the present invention may contain HFC such as difluoromethane, 1,1,1,2,2-pentafluoroethane, 1,1,1,2-tetrafluoroethane, 1,1,1-trifluoroethane, 1,1-difluoroethane, 1,1,1,2,3,3,3-heptafluoropropane, 1,1,1,2,2,3,3-heptafluoropropane, 1,1,1,1,3,3,3-hexafluoropropane, 1,1,1,3,3-pentafluoropropane, 1,1,2,2,3-pentafluoropropane, 1,1,1,3,3-pentafluorobutane, 1,1,1,2,2,3,4,5,5,5-decafluoropentane or 1,1,2,2,3,3,4-heptafluorocyclopentane.

These compounds which may be contained in addition to the fluorinated ether and the alcohol, may be used within a range not to substantially lower the effects of the present invention. A preferred content of such a compound varies depending upon the particular compound, but is usually within a range of at most 30 mass %, preferably at most 20 mass %.

The heat transfer medium of the present invention has high stability against heat or an oxidant. However, the stability against heat or an oxidant will be remarkably improved particularly when a stabilizer such as an anti-oxidation improving agent, a heat resistance-improving agent or a metal deactivator is incorporated.

The antioxidation improving agent and the heat resistance improving agent may, for example, be N,N'-diphenylphenylenediamine, p-octyldiphenylamine, p,p'-dioctyldipheylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine,x p-(t-butyl)phenol, 2,6-di-(t-butyl) phenol, 4-methyl-2,6-di(t-butyl)phenol, 4,4'-methylenebis (2,6-di-t-butylphenol), or a combination of two or more of them.

The metal deactivator may, for example, be imidazole, benzimidazole, 2-mercaptobenzthiazole, salicylidine-propylenediamine, pyrazole, benzotriazole, tolutriazole, 2-methylbenzimidazole, 3,5-dimethylpyrazole or methylenebis-benzotriazole. Further, an organic acid or an ester thereof, a primary, secondary or tertiary aliphatic amine, an amine salt of an organic or inorganic acid, a heterocyclic nitrogen-containing compound, an amine salt of an alkyl phosphate or a derivative thereof, may, for example, be mentioned.

The content of such a stabilizer is usually preferably at most 5 mass %, more preferably at most 1 mass %, in the composition for the heat transfer medium.

The primary cooling means in the present invention is not limited to the cooling step by a refrigeration cycle and may be any means so long as it has a step capable of presenting a heat source for heat energy exchange constantly to lower the temperature. The primary coolant in the present invention may itself be a secondary coolant cooled by means of another primary coolant. Accordingly, as the primary coolant to be used in the present invention, a common coolant which can be used mainly for the refrigeration cycle, or a secondarily cooled brine may be used. Specifically, formic acid, an aqueous solution of calcium chloride, an aqueous solution of sodium chloride, an alcohol, glycol, ammonia, a hydrocarbon, an ether or a fluorocarbon may, for example, be mentioned.

FIG. 1 shows a typical embodiment wherein a displayed commercial product is cooled by the secondary circulation cooling system. At the primary cooling means 1, a primary coolant circulating in the primary cooling means is compressed by a compressor 3 and liquefied and cooled by releasing heat in a condenser 4. Such a primary coolant will pass through an expansion valve 5 and indirectly receive heat from a secondary coolant in a primary/secondary heat exchanger 6. Thereafter, the primary coolant is suitably cooled by an evaporator and returned again to the compressor 3.

The secondary coolant cooled indirectly by the primary coolant in the primary/secondary heat exchanger 6 is sent to each cooling plate 8 in a display case 12 via a secondary coolant circulation line 11 by a circulation pump 7 for secondary circulation cooling. The cooling plate 8 will cool the atmosphere and the commercial product 9 in the display case 12 and at that time, the secondary coolant will absorb heat. Thereafter, the secondary coolant will be returned to the primary/secondary heat exchanger 6 by a return line 10 to secondary circulation cooling and cooled again. The secondary coolant is circulated by the circulation pump 7 for secondary circulation cooling. Thus, in the secondary circulation cooling system, the secondary coolant will carry out heat transfer while it is circulated in the secondary loop by the circulation pump.

In order to carry out the heat exchange efficiently, the heat transfer coefficient is preferably large. In a turbulent flow region, the average heat transfer coefficient in a circular tube can be led from the following formula 1 showing the relation of the Nusselt number, the Reynolds number and the Prandtl number and represented by the following formula 1-1.

$$Nu=0.023Re^{0.8}Pr^{0.4} \quad \text{Formula 1}$$

In the formula 1, the respective symbols are as follows.
Nu (Nusselt number)=$hd/\lambda$,
Re (Reynolds number)=$dG/\eta$,
Pr (Prandtl number)=$C_p\eta/\lambda$.
h: Heat transfer coefficient (W/(m²·K)), d: tube diameter (m), $\lambda$: thermal conductivity (W/(mK)), G: mass velocity (kg/(m²·s)), $\eta$: viscosity (kg/(m·s)), $C_p$: specific heat capacity at constant pressure (J/(kg·K)).

$$h=0.023(dG/\eta)^{0.8}(C_p/\lambda)^{0.4}(\lambda/d) \quad \text{Formula 1-1}$$

With the same tube diameter at the same flow rate, the average heat transfer coefficient depends on the thermal conductivity, specific heat capacity, viscosity and density of the secondary coolant. As such an average heat transfer coefficient is high, it becomes possible to carry out the heat transfer efficiently, and it becomes possible to reduce the size of instruments.

A pressure drop may be mentioned as a factor influential over the power of the circulation pump required for circulating the secondary coolant in the secondary loop. Such a pressure drop $\Delta p$ is represented by the following formula 2. In the formula 2, f is a friction coefficient, $\rho$ is a density (kg/m³), u is a velocity (m/s), l is a tube length (m), and d is a tube diameter (m).

$$\Delta p = 4f(\rho u^2/2)(l/d) \quad \text{Formula 2}$$

Under the same inlet/discharge pressure conditions, the smaller the pressure drop in the pipe line, the higher the efficiency, since the work can be done with a smaller power of the circulation pump. In a turbulent flow region, the friction coefficient in the formula 2 may be represented by the following formula 3 with respect to a flat tube or one close to a flat tube such as a copper tube or a cast iron tube. In the formula 3, Re is the Reynolds number.

$$f=0.0791Re^{-1/4} \quad \text{Formula 3}$$

Accordingly, the pressure drop depends on the viscosity and density of the secondary coolant. The secondary coolant to be used in the present invention has a proper viscosity and density, whereby the pressure drop is small, and the heat transfer coefficient is large.

EXAMPLES

Now, the present invention will be described with reference to Examples. Examples 2 to 9, 11 to 14, 16 to 19 and 21 to 24 represent the present invention, and Examples 1, 10, 15 and 20 are Comparative Examples.

Examples 1 to 5

Figure 2:
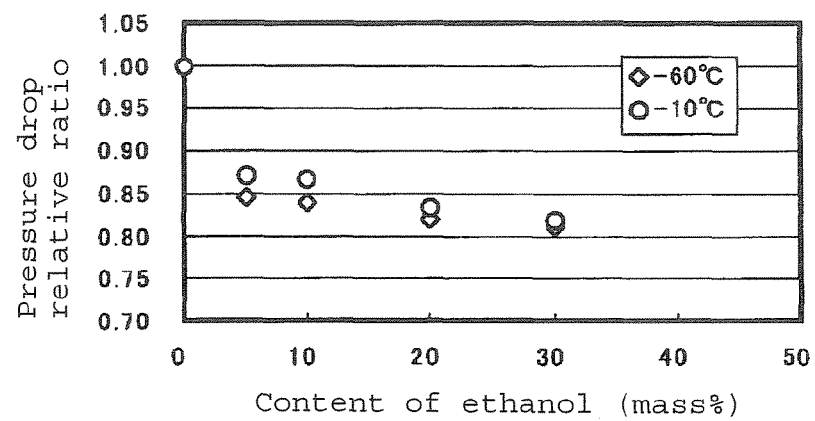
FIG. 2 is a correlation diagram between the content of ethanol in a HFE-347/ethanol mixed solution and the pressure drop relative ratio P.

As the fluorinated ether, $CF_2HCF_2OCH_2CF_3$ (hereinafter referred to as HFE-347) was selected, and as the alcohol, ethanol was selected. With respect to each of the five solutions shown in Table 1, the pressure drop relative ratio P to HFE-347 (at −10° C. and at −60° C.) was calculated.
Pressure drop relative ratio $P=\Delta p^x/\Delta p^0$
$\Delta p^x$: Pressure drop of a mixed solution of HFE-347 and ethanol
$\Delta p^0$: Pressure drop of HFE-347
$\Delta p^x$ and $\Delta p^0$ were calculated based on the formula 2. The results are shown in FIG. 2.

Figure 3:
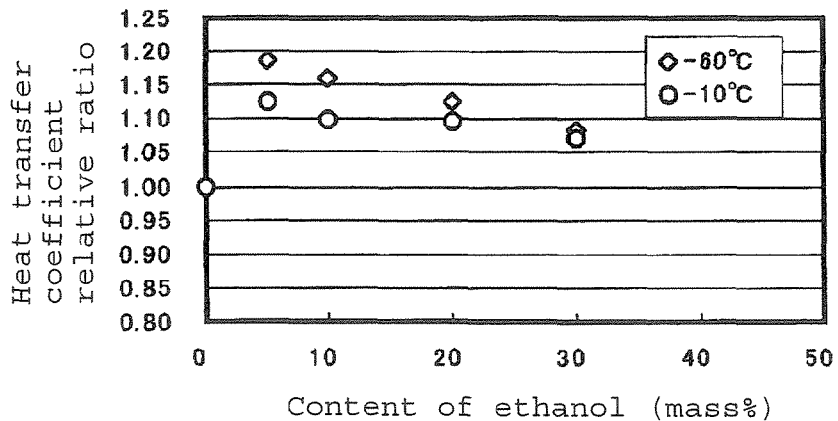
FIG. 3 is a correlation diagram between the content of ethanol in a HFE-347/ethanol mixed solution and the heat transfer coefficient relative ratio H.

Further, with respect to each of the five solutions shown in Table. 1, the heat transfer coefficient relative ratio H to HFE-347 (at −10° C. and at −60° C.) was calculated.
Heat transfer coefficient relative ratio $H=h^x/h^0$
$h^x$: Heat transfer coefficient of the mixed solution of HFE-347 and ethanol
$h^0$: Heat transfer coefficient of HFE-347
$h^x$ and $h^0$ were calculated based on the formula 1-1.
The results are shown in FIG. 3.

With respect to the density $\rho$ and the viscosity $\eta$, the literature values and the values measured by the applicant company were used, and the specific heat capacity at constant pressure $C_p$ and the thermal conductivity $\lambda$ were assumed from the structures of the substances. With respect to the tube diameter d, the length l and the velocity u, they were assumed to be the same in every case.

TABLE 1

|  | Ex. 1 | Ex. 2 | Ex. 3 | Ex. 4 | Ex. 5 |
| --- | --- | --- | --- | --- | --- |
| Mass ratio of HFE-347/ethanol | 100/0 | 95/5 | 90/10 | 80/20 | 70/30 |

From FIG. 2, it is evident that the pressure drop decreases by mixing ethanol. Further, from FIG. 3, it is is evident that the heat transfer coefficient increases by mixing ethanol. It is evident that the heat transfer coefficient is particularly large in the case of Example 2 wherein the content of ethanol is 5 mass %.

Examples 6 to 9

Figure 4:
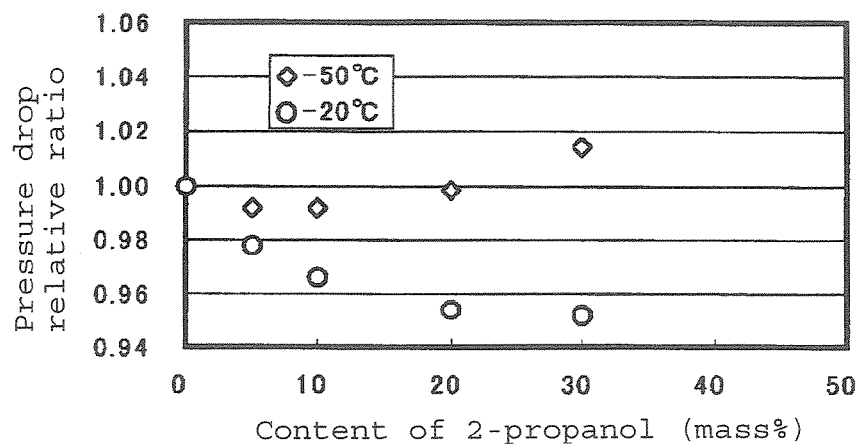
FIG. 4 is a correlation diagram between the content of 2-propanol in a HFE-347/2-propanol mixed solution and the pressure drop relative ratio P.

As the fluorinated ether, $CF_2HCF_2OCH_2CF_3$ (hereinafter referred to as HFE-347) was selected, and as the alcohol, 2-propanol was selected. With respect to each of the five solutions shown in Table 2, the pressure drop relative ratio P to HFE-347 (at −20° C., and at −50° C.) was calculated in the same manner as in Examples 1 to 5. The results are shown in FIG. 4. From FIG. 4, it is evident that the pressure drop decreases by mixing 2-propanol. In Example 9, the pressure drop is slightly increased, but the composition in Example 9 has a large heat transfer coefficient, and it can be said that the overall performance of the secondary coolant is excellent.

TABLE 2

|  | Ex. 1 | Ex. 6 | Ex. 7 | Ex. 8 | Ex. 9 |
|---|---|---|---|---|---|
| Mass ratio of HFE-347/2-propanol | 100/0 | 95/5 | 90/10 | 80/20 | 70/30 |

Examples 10 to 14

Figure 5:
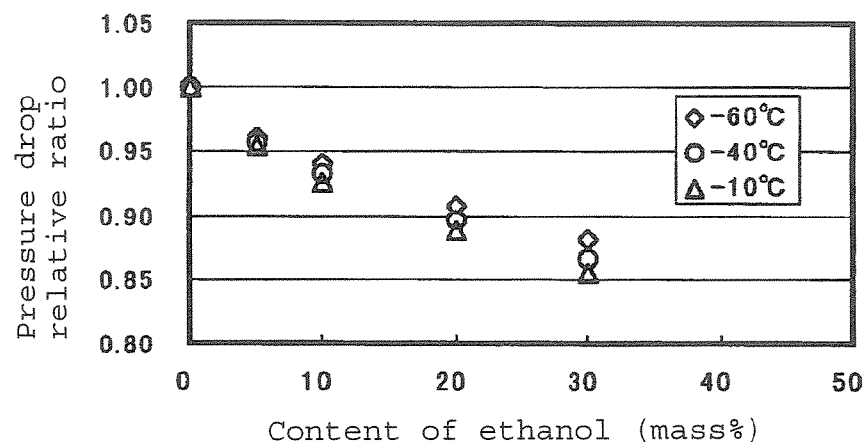
FIG. 5 is a correlation diagram between the content of ethanol in a $C_4F_9OCH_3$/ethanol mixed solution and the pressure drop relative ratio P.

As the fluorinated ether, $C_4F_9OCH_3$ was selected, and as the alcohol, ethanol was selected. With respect to each of the five solutions shown in Table 3, the pressure drop relative ratio P to $C_4F_9OCH_3$ (at −10° C., at −40° C. and at −60° C.) was calculated in the same manner as in Examples 1 to 5. The results are shown in FIG. 5. From FIG. 5, it is evident that the pressure drop decreases by mixing ethanol.

TABLE 3

|  | Ex. 10 | Ex. 11 | Ex. 12 | Ex. 13 | Ex. 14 |
|---|---|---|---|---|---|
| Mass ratio of $C_4F_9OCH_3$/ethanol | 100/0 | 95/5 | 90/10 | 80/20 | 70/30 |

Examples 15 to 19

Figure 6:
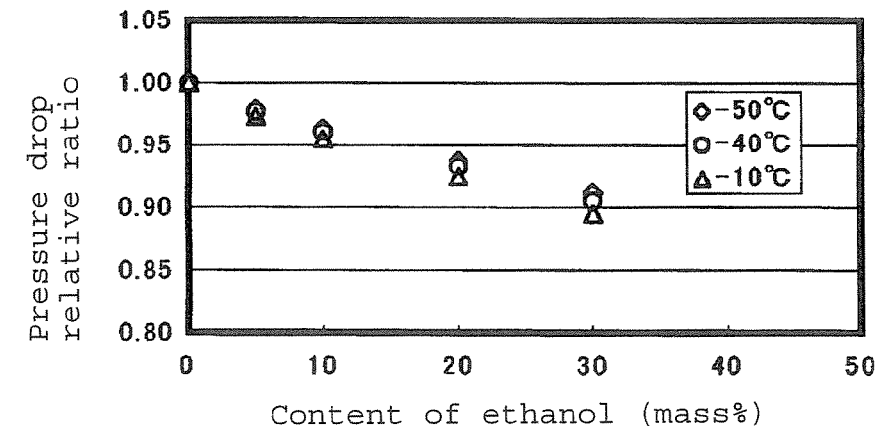
FIG. 6 is a correlation diagram between the content of ethanol in a $C_4F_9OC_2H_5$/ethanol mixed solution and the pressure drop relative ratio P.
Figure 7:
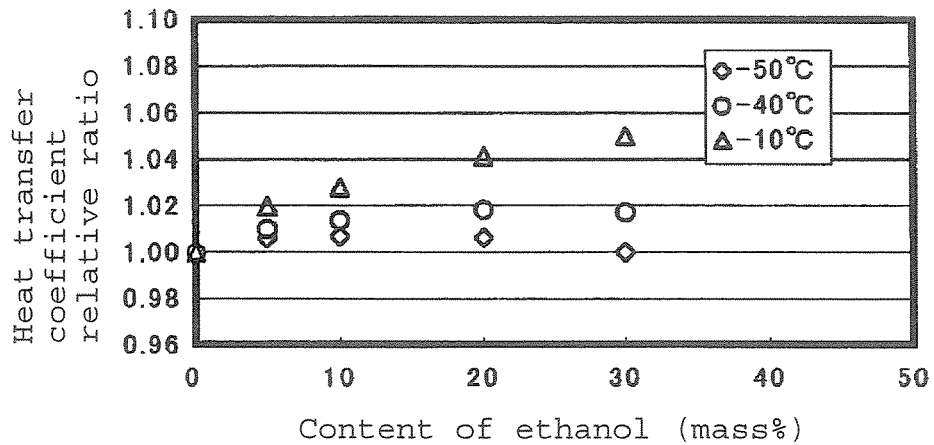
FIG. 7 is a correlation diagram between the content of ethanol in a $C_4F_9OC_2H_5$/ethanol mixed solution and the heat transfer coefficient relative ratio H.

As the fluorinated ether, $C_4F_9OC_2H_5$ was selected, and as the alcohol, ethanol was selected. With respect to each of the five solutions shown in Table 4, the pressure drop relative ratio P to $C_4F_9OC_2H_5$ (at −10° C., at −40° C. and at −50° C.) was calculated in the same manner as in Examples 1 to 5. The results are shown in FIG. 6. From FIG. 6, it is evident that the pressure drop decreases by mixing ethanol. Further, in the same manner as in Examples 1 to 5, the heat transfer coefficient relative ratio H (at −10° C., at −40° C. and at −50° C.) was calculated. The results are shown in FIG. 7. From FIG. 7, it is evident that the heat transfer coefficient increases by mixing ethanol. Further, in the case of −10° C. in Example 19, the heat transfer coefficient is not increased, but the composition in Example 19 has a small pressure drop, and it can be said that the overall performance of the secondary coolant is excellent.

TABLE 4

|  | Ex. 15 | Ex. 16 | Ex. 17 | Ex. 18 | Ex. 19 |
|---|---|---|---|---|---|
| Mass ratio of $C_4F_9OC_2H_5$/ethanol | 100/0 | 95/5 | 90/10 | 80/20 | 70/30 |

Examples 20 to 24

Figure 8:
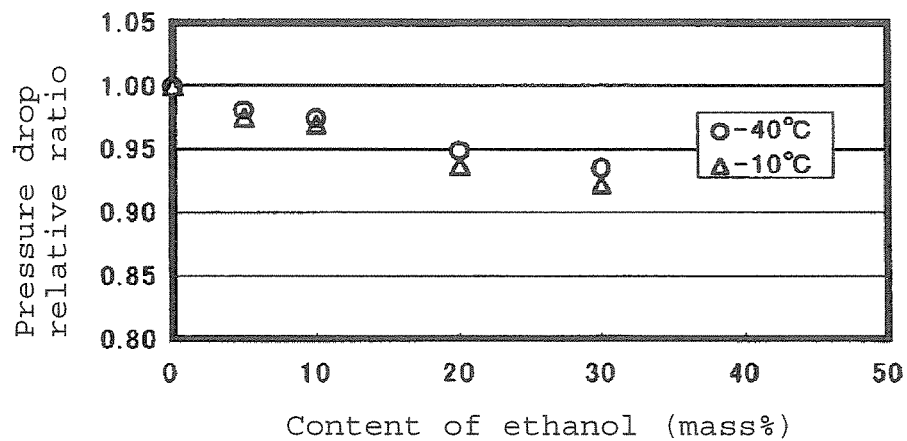
FIG. 8 is a correlation diagram between the content of ethanol in a $C_3F_7OCH_3$/ethanol mixed solution and the pressure drop relative ratio P.
Figure 9:
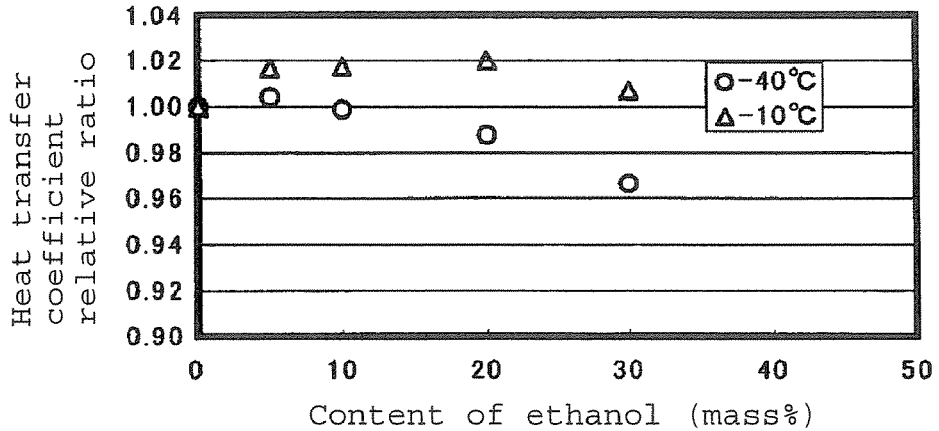
FIG. 9 is a correlation diagram between the content of ethanol in a $C_3F_7OCH_3$/ethanol mixed solution and the heat transfer coefficient relative ratio H.

As the fluorinated ether, $C_3F7OCH_3$ was selected, and as the alcohol, ethanol was selected. With respect to each of the five solutions shown in Table 5, the pressure drop relative ratio P to $C_3F_7OCH_3$ (at −10° C. and at −40° C.) was calculated in the same manner as in Examples 1 to 5. The results are shown in FIG. 8. From FIG. 8, it is evident that the pressure drop decreases by mixing ethanol. Further, in the same manner as in Examples 1 to 5, the heat transfer coefficient relative ratio H (at −10° C. and at −40° C.) was calculated. The results are shown in FIG. 9. From FIG. 9, it is evident that the heat transfer coefficient increases by mixing ethanol. Further, in the case of −10° C. in Examples 22 to 24, the heat transfer coefficient is slightly small, but each of the compositions in Examples 22 to 24 has a small pressure drop, and it can be said that the overall performance of the secondary coolant is excellent.

TABLE 5

|  | Ex. 20 | Ex. 21 | Ex. 22 | Ex. 23 | Ex. 24 |
|---|---|---|---|---|---|
| Mass ratio of $C_3F_7OCH_3$/ethanol | 100/0 | 95/5 | 90/10 | 80/20 | 70/30 |

INDUSTRIAL APPLICABILITY

The present invention is useful as a secondary circulation cooling system comprising a primary cooling means using a primary coolant, a secondary circulation cooling means using a secondary coolant, and a heat exchange means to carry out heat exchange between the primary coolant and the secondary coolant.

The entire disclosure of Japanese Patent Application No. 2004-337577 filed on Nov. 22, 2004 including specification, claims, drawings and summary is incorporated herein by reference in its entirety.

What is claimed is:

1. A secondary circulation cooling system comprising:
   a primary cooling means using a primary coolant,
   a secondary circulation cooling means using a secondary coolant and
   a heat exchange means to carry out heat exchange between the primary coolant and the secondary coolant,
   wherein the secondary coolant is a composition comprising:
   1 to 15 mass % of an alcohol selected from the group consisting of ethanol, and 2-propanol; and
   85 to 99 mass % of a fluorinated ether having the formula $CF_2HCF_2OCH_2CF_3$.

2. The secondary circulation cooling system according to claim 1, wherein the alcohol is ethanol.

3. The secondary circulation cooling system according to claim 1, wherein the alcohol is 2-propanol.

* * * * *